US011861394B2

(12) United States Patent
Natarajan et al.

(10) Patent No.: US 11,861,394 B2
(45) Date of Patent: Jan. 2, 2024

(54) AUTOMATED SEMANTIC TAGGING

(71) Applicant: Oracle International Corporation, Redwood Shores, CA (US)

(72) Inventors: Balasubramanian Natarajan, Hosur (IN); Murali Gururajan, Hosur (IN); Priyamvadha Ragavan, Bangalore (IN); Prashant Prakash, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/194,895

(22) Filed: Apr. 3, 2023

(65) Prior Publication Data

US 2023/0236876 A1    Jul. 27, 2023

Related U.S. Application Data

(63) Continuation of application No. 17/830,296, filed on Jun. 1, 2022, now Pat. No. 11,645,108, which is a (Continued)

(51) Int. Cl.
*G06F 9/48* (2006.01)
*G06F 16/901* (2019.01)
*G06F 9/54* (2006.01)

(52) U.S. Cl.
CPC .............. *G06F 9/4843* (2013.01); *G06F 9/54* (2013.01); *G06F 16/9024* (2019.01)

(58) Field of Classification Search
CPC ....... G06F 9/4843; G06F 9/54; G06F 16/9024
See application file for complete search history.

(56) References Cited

U.S. PATENT DOCUMENTS 7,657,411 B2    2/2010    Poetsch et al.
7,752,299 B2    7/2010    Bookman et al.
(Continued)

FOREIGN PATENT DOCUMENTS

WO    2004077270 A2    9/2004

OTHER PUBLICATIONS

U.S. Appl. No. 16/560,782, Notice of Allowance, dated Mar. 9, 2022, 14 pages.
(Continued)

*Primary Examiner* — Dong U Kim
(74) *Attorney, Agent, or Firm* — Kilpatrick Townsend & Stockton LLP

(57) ABSTRACT

Methods and systems are disclosed for automated semantic tagging that include detecting a particular thread executed by a processor and identifying a root process of the particular thread. An object-process link may be by linking an object that executed code that called the particular thread to the root process. A thread list of thread definitions of the object may be identified. A particular thread definition that corresponds to the particular thread can be mapped. Resource types to be consumed upon executing an instance of the thread instantiated from the particular thread definition can be identified and the corresponding values of the resource types can be determined. A process specification can be generated that encapsulates the thread definition, resource types and values so as to reproduce a state of the root process at a point in which the particular thread executed.

20 Claims, 6 Drawing Sheets

Related U.S. Application Data continuation of application No. 16/560,782, filed on Sep. 4, 2019, now Pat. No. 11,379,260.

(56) References Cited

U.S. PATENT DOCUMENTS

| | | | | |
|---|---|---|---|---|
| 8,332,864 | B2* | 12/2012 | Bose | G06Q 10/06 |
| | | | | 718/100 |
| 9,020,944 | B2 | 4/2015 | Srivastava et al. | |
| 11,379,260 | B2 | 7/2022 | Natarajan et al. | |
| 11,645,108 | B2 | 5/2023 | Natarajan et al. | |
| 2009/0089194 | A1 | 4/2009 | Mathis et al. | |
| 2010/0299438 | A1* | 11/2010 | Zimmerman | H04N 7/17318 |
| | | | | 707/769 |
| 2011/0131558 | A1* | 6/2011 | Young | G06F 8/54 |
| | | | | 717/145 |
| 2012/0116836 | A1 | 5/2012 | Flores et al. | |
| 2014/0324518 | A1* | 10/2014 | Roitman | G06F 30/18 |
| | | | | 705/7.27 |
| 2015/0127762 | A1* | 5/2015 | Srinivasan | H04L 69/32 |
| | | | | 709/212 |
| 2019/0370308 | A1* | 12/2019 | Riggs | G06F 17/142 |
| 2020/0241917 | A1* | 7/2020 | Chen | G06F 9/3836 |

OTHER PUBLICATIONS

U.S. Appl. No. 17/830,296, Notice of Allowance, dated Feb. 15, 2023, 12 pages.

Koszela , "Method of Similarity Business Processes by Genetic Tagging for Warehouses of Processes and Process Mining", WSEAS Transactions on Business and Economics, vol. 14, 2017, pp. 206-214.

Wen et al., "Process Semantic-Enabled Customisation for Active Service Provisioning", 13th IEEE International Conference on Computational Science and Engineering, 2010, pp. 375-381.

Schmidt et al., "An Overview of the Real-Time CORBA Specification", Institute of Electrical and Electronics Engineers, vol. 33, No. 6, Jun. 2000, pp. 56-63.

* cited by examiner

AUTOMATED SEMANTIC TAGGING

CROSS-REFERENCE TO RELATED APPLICATIONS

This application is a continuation of U.S. patent application Ser. No. 17/830,296, filed Jun. 1, 2022, which is a continuation of U.S. patent application Ser. No. 16/560,782, filed Sep. 4, 2019, now U.S. Pat. No. 11,379,260, granted Jul. 5, 2022, the entire disclosures of which are incorporated by reference, for all purposes, as if fully set forth herein.

FIELD

The present invention relates generally to the automated semantic tagging, and more particularly to a transaction framework incorporating semantic data.

BACKGROUND

Software executing within a hardware environment is often composed of a number processes that can execute to provide the functionality of the software. Each process may be composed of discrete sets of instructions that execute to provide intermediate functionality of the process. Since each set of instructions is discrete, the processor of the hardware environment executes each set without regard to the set of instructions that came before a particular set or the set of instructions that will execute after. This may compound problems caused by poorly developed software, software errors, and memory leaks. For instance, lacking details of other sets of instructions may cause the processer to execute duplicate sets of instructions or to execute an infinite loops, which may occur when a set of instructions points to a previously executed set of instructions as the next set of instructions to be executed.

In some instances, the hardware environment may address the issue by using a scheduler to schedule each set discrete for execution by the processer of the hardware environment. The scheduler may receive some information associated with sets of instructions to be executed and provide further analysis in attempt to progressively schedule each set. Yet, while the scheduler has more detail with respect to the number of sets to be executed, an intended order, etc., the scheduler often lacks the information to able to prevent duplicates or infinite loops. For instance, schedulers lack state information associated with the sets of instructions such as input/output, memory registers, associations with other sets of instruction or processes, branches, etc.

SUMMARY

Aspects of the present disclosure include methods for automated semantic tagging by generating process specifications for threads. The methods include detecting, by a semantic mapping application programming interface (API), a particular thread executed by a processor; identifying a root process of the particular thread, the root process providing a function to a computing device by executing one or more threads, the particular thread being one of the one or more threads, and wherein and the particular thread providing an intermediate function of the process; generating, based on the particular thread and the root process, an object-process link by linking an object that executed code that called the particular thread to the root process; identifying a thread list of the object that includes an identification of one or more thread definitions, wherein each thread definition is configured to instantiate a thread; generating process specification for the root process by: matching a particular thread definition of the one or more thread definitions to the particular thread; identifying, using the particular thread definition, an identification of one or more resource types to be consumed upon executing an instance of the thread instantiated from the particular thread definition; determining a value corresponding to each resource type of the one or more resource types; and generating a process specification that encapsulates the thread definition, identification of the one or more resource types, and the value corresponding to each resource type of the one or more resource types, the process specification configured to reproduce a state of the root process at a point in which the particular thread executed.

Another aspect of the present disclosure includes a system comprising one or more processors and a non-transitory computer-readable media that includes instructions that when executed by the one or more processors, cause the one or more processors to perform methods described above.

Another aspects of the present disclosure include a non-transitory computer-readable media that includes instructions that when executed by one or more processors, cause the one or more processors to perform the methods described above.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
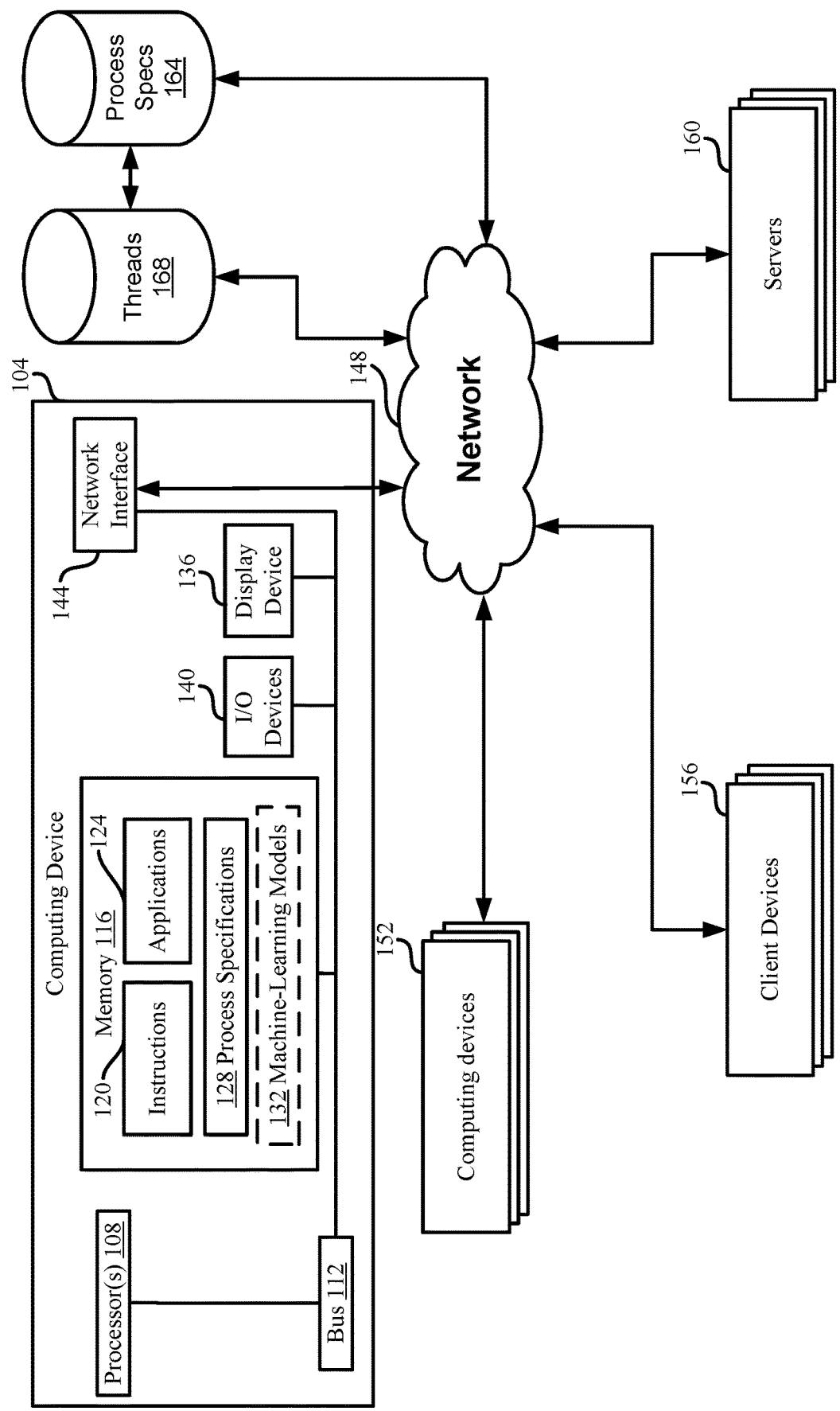
FIG. 1 illustrates a block diagram of a semantic tagging system 100 according to at least one aspect of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The automated semantic tagging system monitors execution of threads within a processing environment and tags additional data to the record of the execution to generate process specifications that can recreate the state of a process at a point in which the thread of the process executed. A configuration layer enables configuration of objects, threads, and processes that can be monitored during execution of the application. An interface between an application class and the configuration layer may enable detection of the objects, threads, or processes during execution. Upon detecting execution of a monitored thread, for instance, triggers generation of a process specification that encapsulates the relationships between the thread, the object that called the thread, the process within which thread is executing, and a thread definition of the thread that indicates the design time properties of the thread. THe process specification may be stored locally or remotely and used to refine the application during or after runtime.

Each process may be represented by multiple process specifications with one process specification corresponding to each thread of the process. This can allow for tracing the state of the process through the entire execution of the process. In some instances, the process may be replayed in a simulation that reproduce the exact functionally of the particular process when it executed including any particularities of that particular execution such as errors, faults, resource leaks, cycles, or the like. The computing device may step through each thread of the process to identify root cause of the error, fault, resource leak, cycles, or the like (e.g., the particular thread, the particular execution conditions, particular instructions, or the like).

In some instances, the process specification may be used to modify the processes of the application either during runtime as the processes are executing or before a subsequent execution. For instance, the root cause of particular functionality (e.g., errors, execution time, resource use, or the like) may be used to modify threads of a process prior to the threads subsequent execution in order to reduce or eliminate the functionality. The thread definitions may be modified by adding resource constraints to the allocation of resources, modifying loops, modifying conditional branches, adding exception handling, modifying network targets to redirect requests of the threads to different computing devices, or the like.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 illustrates a block diagram of a semantic tagging system 100 according to at least one aspect of the disclosure. Semantic tagging system 100 may execute one or more processes of one or more software applications. In some instances, the at least one software application of the one or more software applications may be a distributed software application that executes on one or more computing devices or thread execution cores. A software application may include one or more processes (e.g., components) that provide the functionality of the application. The one or more processes may execute in series (e.g., one process at a time), concurrently (e.g., such as one process executing in parallel with another process), or a combination thereof. When executing in parallel the processes may execute synchronously or asynchronously.

A process may include one or more threads (e.g., a set of instructions that provide a function such as a transaction) that execute to provide an intermediate function of the process. Each thread can be executed independently from other set threads. Like processes, threads can be scheduled to execute in series, concurrently, or a combination thereof. Some threads may be called by an object of the application layer. For instance, objects can include one or more thread definitions (e.g., activities), each thread definition can be processed to generate an instance of a thread. The thread definition may include, for example, one or more instructions executed by the thread, identification of one or more other threads, resource types necessary to execute the thread, a root process within which the thread can execute, combinations thereof, and the like. In some instances, processing the thread definition to generate an instance of the thread can include compiling or interpreting the set of instructions of the thread.

A process can be executed by one or more processors on one computing device or across multiple computing device (e.g., in a distributed processing system). For instance, computing device 104 may execute one or more applications. Executing each application may include generating one or more processes, which may include generating one or more threads. Applications 124 may be stored in persistent memory in a compiled or uncompiled state. When executed, the one or more sets of instructions may execute by processor 108 to spawn a process. As the process executes, instructions may execute to generate one or more threads that can be executed by processor 108 to provide the function of the process. Memory 116 may also include instructions 120 that can include instructions that are independent from applications 124 such as an operating system or firmware, or the like or instructions that facilitate execution of at least one application such as hardware drivers, interfaces, previously executed processes, threads, or objects, or the like.

In some instances, an application may use a process specification of process specifications 128 to modify a process of an application prior to spawning the process. For instance, computing device 104 may identify an error such as an missed branch or an infinite loop that may waste the resources of computing device 104 and semantic tagging system 100. A process specification may indicate the state of a thread of a process. Since threads are typically stateless, a particular thread may not indicate the cause of the error. A thread specification may provide the state of the process at the point in which the thread executed to provide an indication as to the cause of the error or wasted resource. Instructions 120 may include one or more routines for analyzing process specifications such as by tracing the threads that come before or after the particular thread of the thread specification. The one or more routines may additionally, and automatically, execute to modify the process to eliminate redundant threads; eliminate cycles such as infinite loops; reduce resource consumption such as processor cycles; memory use; network bandwidth; or the like.

Process specifications 128 may include process specifications that were generated from threads of processes previously executed by processor 108. In some instances, process specifications 128 may include additional process specifications received over network 148 from other computing devices 152. Computing devices 152 may have a same, similar, or different structure from computing device 104. In some instances, process specifications may be analyzed using one or more machine-learning models 132. For instance, one or more thread specifications may be packaged into a feature set that can be input into a machine-learning model to derive characteristics of process that may be less prone to errors or a characteristic of processes that may execute with less resources of computing device 104 or semantic tagging system 100.

A feature set may be defined using sets of process specifications over a time interval. In some instances, a feature set may include each process specification of a particular process. In other instances, a feature set may include may include process specifications generated over a time interval such as process specification generated from multiple threads across one or more processes. This may be advantageous to capture errors in a process that may execute correctly once despite previous executions ending in error. In some instances, features sets may be defined over variable time intervals such as a first feature set that may include one or more process specifications over a first time interval and a second feature set that may include process specifications over a second time intervals. Features sets may be defined from process previously executed by computing device 104, from process executed by other computing devices 152, or from a combination thereof. In some instances, feature sets may be generated from manufactured process specifications. Manufactured process specifications may be procedurally generated to include particular data, random data, or combination thereof. Manufactured process specifications may be generated by automatically or by an operator rather than from a process that executed by processor 108.

The machine-learning models may be trained using feature sets from process specifications 128, manufactured thread specifications, process specification received from computing device 152, or the like. Machine-learning models 132 may be trained using supervised or unsupervised learning. In supervised learning, the feature sets can include labeled data that indicates an expected output such as an ideal process, an ideal thread of a process, a state of a thread, properties of the process or thread, an error or fault, resources consumed by the process or thread, or the like. For example, the feature set may be labeled with a particular error. The machine-learning model may use the feature set, as input, and the labels, as expected output, to define one or more functions that will output identify a process or thread that may cause a similar error. The accuracy of the one or more functions, and the machine-learning model, may depend on the number of feature sets used to train the machine-learning model. Examples of algorithms that can be used for supervised learning include, but is not limited to, regression such as random forest, linear and non-linear; Bayesian statistics; neural networks; decision trees; Gaussian process regression; nearest neighbor; long short-term memory; deep learning algorithms; combinations thereof; and the like.

In unsupervised learning, the feature sets may not be labeled such that the machine-learning model may not have access to the expected values of the one or more additional properties associated with a given input feature set. Since the expected values are unknown, the machine-learning model may use different algorithms from those used during supervised learning. Unsupervised learning may focus on identifying correlations between (1) two or more thread specifications of a feature set, (2) two or more processes of a feature set, (3) two or more threads of a feature set, or (4) two or more feature sets. The machine-learning model may indicate that certain properties of a process specification are a better indicator of predicting an error or identifying a root cause of an error than other properties. For instance, the machine-learning model may identify a correlation between a particular threads of a process and an error detected upon executing the process that may indicate the order of the particular threads may be the cause of the error. In some instances, correlated properties may be weighted higher than other properties to further improve the identification of particular characteristics of thread specifications. Examples of unsupervised learning algorithms for machine-learning models include, but are not limited to, clustering, neural networks, outlier detection, combinations thereof, or the like.

The machine-learning models may be trained over a predetermined interval of time that can be based on the size of the feature sets (e.g., the quantity of process specifications in each feature set) and the number of feature sets used for training. In some instances, training may continue until a predetermined threshold is met. For instance, training may continue until a predetermine number of feature sets are processed by the machine-learning model 132. In another example, training may continue until the machine-learning model 132 reaches a predetermined accuracy threshold. Accuracy may be determined by passing labeled feature sets into the machine-learning model and matching the output to the label. In other instances, accuracy may be determined based on user analysis of the training process, the output of the machine-learning models on contemporaneously collected process specifications, or the rate at which the machine-learning model generates an output from a given input. In some instances, the machine-learning models may be continuously trained, first using the training feature sets and then using contemporaneously obtained process specifications from process specifications 128 to further improve the accuracy of machine-learning models 132.

An accuracy value associated with machine-learning models 132 may be used to trigger re-training or provisioning new machine-learning models. If the accuracy value falls below a first threshold value then the re-training or provisioning may be triggered. In the instance of re-training, machine-learning models 132 may continue to analyze process specifications, but the output may include an indication that re-training has occurred to warn an operator that the output may not be up to the threshold level of accuracy. In the instance of provisioning, the machine-learning model may be replaced with a new machine-learning model. The new machine-learning model may be trained in the same manner as described above. In some instances, the output of machine-learning models 132 may be compared to a second and lower accuracy threshold, such that if accuracy falls below the first threshold but is above the second threshold, retraining may occur. If the accuracy falls below both the first threshold and the second threshold, then a new machine-learning model may be provisioned. The new machine-learning model may be trained in the same manner as described above.

Computing device 104 may include one or more input/output devices 140 such as a keyboard, mouse, other human-machine interface devices, or the like accept input from one or more users of computing device 104. Computing device 104 may include one or more display devices 136 that can provide a graphical user interface for the one or more users to interact with applications 124, to provide or review analysis of process specifications, modification of processes and threads, or the like.

Computing device 104 may include network interface 144 that provides wired and/or wireless communications with other devices of network 148. The network interface may enable computing device 104 and computing devices 152 to operate a distributed environment for one or more applications of applications 124. For instance, an application of applications 124 may be a distributed application that executes on computing device 104 and on computing devices 152. Client devices 156 may transmit commands to the application via computing device 104 or computing devices 152 through network 148 to coordinate the operation of the application. In this instance, computing device 104 and computing devices 152 may provide all of the resources needed to execute the application and client device 156 may enable a remote user to access the application as if the application was executing locally. This may enable faster execution of the application as the application can pool the resources of each device of the distributed environment. In addition, the user of client device 156 does not need to install the application locally to access the full functionality of the application.

Servers 160 may store one or more applications that can be provisioned onto the computing device 104 and computing devices 152. For instance, client devices 156 may request access to a distrusted application that is not currently running. Servers 160 may provision one or more computing devices, or as many computing devices as needed to provide the functionality or efficiency requested by the client devices 156, to by remotely installing the application onto the one or more computing devices and establishing the distributed environment. Servers 160 may store historical process specifications, error logs, event logs, and the like.

Servers 160 may store the historical process specifications, error logs, event logs, and the like remotely in one or more databases such as threads database 168 and process specifications database 164. Threads database 168, may store threads that have previously executed as well as thread definitions. Process specification database 164 may store the process specifications from previous executions of applications. In some instances, computing device 104 may store thread definitions and process specifications within threads database 168 and process specifications database 164 for later access. Central storage may enable process specifications generated by computing device 104 to be accessed by other computing devices 152 executing the same distributed application. This can further improve analysis of thread specifications across the entire distrusted environment rather than at a single computing device.

Figure 2:
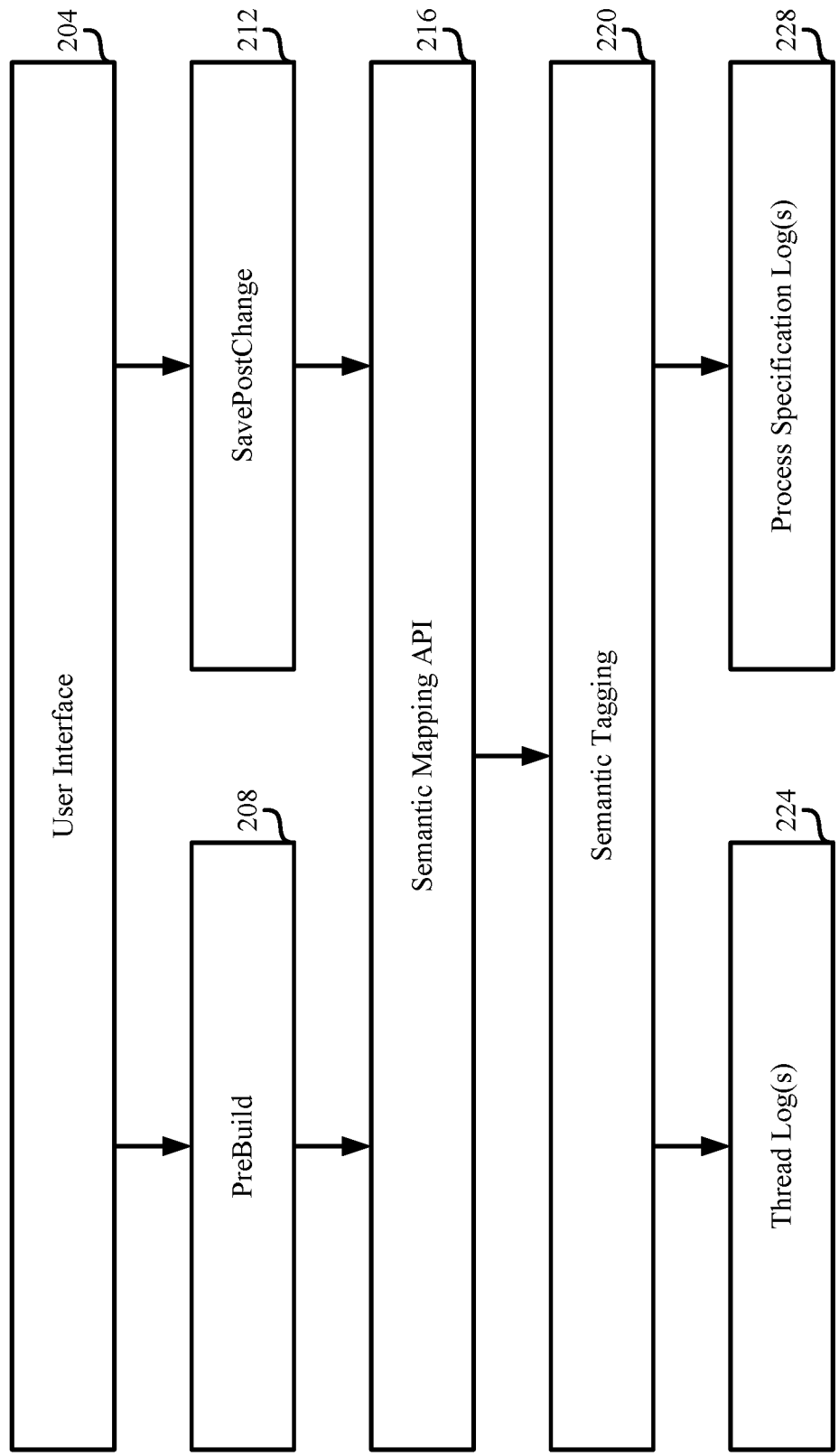
FIG. 2 is a block diagram of a semantic tagging system framework according to at least one aspect of the disclosure.

FIG. 2 is a block diagram of a semantic tagging system framework according to at least one aspect of the disclosure. In some instances, the semantic tagging system framework includes a processing layer that is between the application processes and system processes to enable capturing state information of the application processes during and after execution by the processor. The added processing layer enables capturing process specifications for any application executing by a computing device and the granularity detail captured to generate the process specification may be configurable by a user operating user interface 204. In other instances, the application may be modified to include the added processing layer.

During configuration time, user interface 204 may enable user input to modify a the processing layer or a build of the application. One or more hooks may be added to the processing layer or build to trigger data acquisition upon detecting particular events such as thread execution. Prebuild 208 may include a portion of the processing layer or application that is preconfigured (e.g., without the hooks). User interface 204 may enable a user to add the configuration to the build and execute a SavePostChange 212 command to post the change to the build and save it. In some instances, SavePostChange 212 may require the software build to be recompiled prior to execution. In other instances, the added content may be store separately from the build and compiled or interpreted at runtime (e.g., using a just-in-time compiler or the like).

The modifications added by user input may be used to configure a semantic mapping application programming interface (API) 216 provides an interface between the component processing of the application and the processing layer that is specific to the application class. Semantic mapping API 216 includes one or more functions that enable access to the application class of the application. The application class of the application includes the objects, thread definitions, attributes, of the application. The semantic mapping API enables access to the data of the application class during runtime such that threads of a process of the application that are executed by the processor can be monitored. For instance, the semantic mapping API 216 may monitor an application and trigger a flag, registry entry, Once semantic mapping API 216 is configured to monitor particular aspects of the applications, the application may be executed. During execution, the semantic tagging 220 may use the semantic mapping API 216 to access the details of the application class. For instance, the semantic mapping API 216 may trigger a flag when a particular thread executes. Semantic tagging 220 may access semantic mapping API in response to detecting the flag to gather details about the state of the thread. Semantic tagging 220 may generate a thread log 224 indicating that the thread executed including the thread definition for the thread. In addition, semantic tagging may generated a process specification log 228.

For example, in response to detecting the flag, the semantic tagging 220 may use the semantic mapping API 216 to identify a process (e.g., component) of the application within which the particular thread (e.g., transaction) executed and map the process to an object that called the particular thread. The semantic tagging may further identify one or more thread definitions of the object, identify the particular thread definition that corresponds to the particular thread, identify the resource types (e.g., attributes) that correspond to the particular thread definition, and identify the value that correspond to each resource type. The data may be packaged into the process specification log 228.

Figure 3:
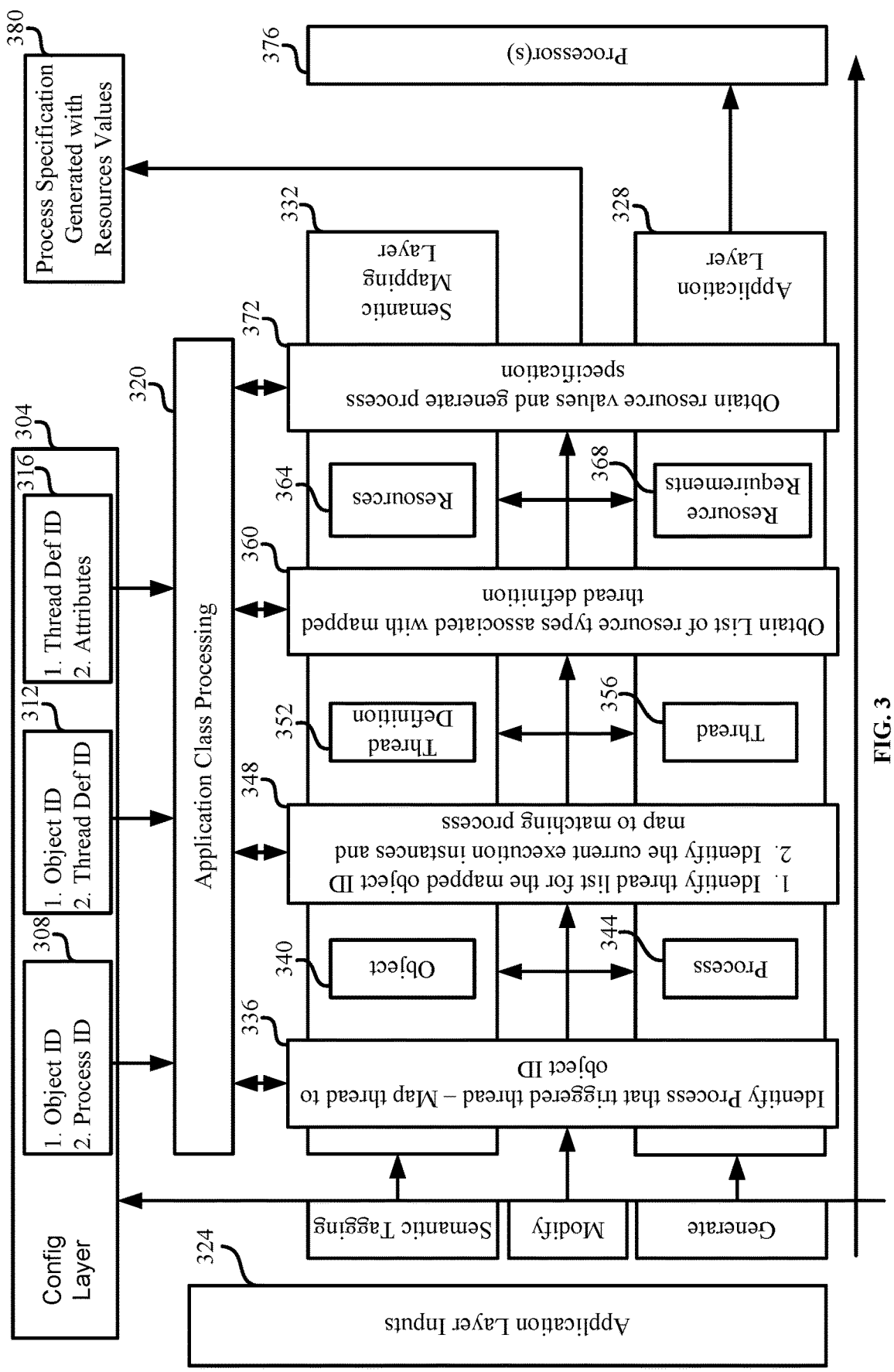
FIG. 3 is a block diagram of the semantic tagging system according to at least one aspect of the disclosure.

FIG. 3 is a block diagram of the semantic tagging system 300 according to at least one aspect of the disclosure. Automated semantic tagging system 300 provides for logging process specifications that can be used to modify future processes at runtime. Configuration layer 304 may include an interface to receive input that configures the processes, threads, and resources that can be monitored during execution of one or more applications. For instance, mapping block 308 may provide a mapping between two properties of the automated semantic tagging system 300, such as object identifiers and process identifiers. Configuration layer 304 may include mapping block 312, which provides a mapping between object identifiers and thread definition identifiers, and mapping block 316, which may provide a mapping between thread definition identifiers and attributes of a thread.

In some instances, the mapping of each property of mapping blocks 308, 312, and 316 may include may include wildcard operators, timestamps, types, or the like to indirectly map the object identifiers and process identifiers. For instance, mapping block 308 may indicate objects of a particular type may be associated with processes of a particular type. Automated semantic tagging system 300 may not store static associations that may be known prior to runtime. Instead, configuration layer 304 may provide abstract mappings that in which the mappings may be detected at runtime. Configuration layer may include more or less mapping blocks than mapping blocks 308, 312, and 316. In some instance, a mapping block may map more than two properties such as, by example, object, process, and thread definition. Mapping blocks may maps one-to-one, one-to-many, or many-to-many.

Configuration layer 304 may include a semantic mapping API that may include logic to inspect application class processes 320. Application class processing 320 may expose an interface that provides access to particular types of processes, threads, variables, resources and the like of an application to configuration layer 304. In some instances, each application may include its own instance of application class processing 320. In other instances, one instance of application class process 320 may operate for one or more applications. Application class processing 320 may expose all processes, threads, variables, resources and the like of an application or only portion thereof. For instance, for an application that provides varied functionality such as signal processing and data modeling, application class processing 320 may expose the processes, threads, variables, resources and the like that correspond to the signal processing but not the data modeling. Application class processing 320 may mark some processes, threads, variables, resources and the like as exposed or protected through metadata or through code of the underlying application.

Application layer inputs 324 may be an interface between a input/output devices and the application executing on a computing device. For instance, the application layer inputs 324 may direct application layer 328 to generate a process or execute one or more threads or modify one or more processes or threads. Application layer inputs 324 may modify the application layer data by tagging semantic processing data via semantic mapping layer 332 to generate process specifications upon execution of a particular thread.

Application layer 328 may represent the high level operations of an application executing on the computing devices. Application layer 328 may include compiled instructions that generate processes that provide the functionality of the application, objects, object definitions, data, and metadata. Object definitions provides a flexible architecture for establishing and maintaining relationships between various kinds of thread definitions for each of the processes and forms the foundation for the data layer model. Application layer 328 may instantiate object definitions thereby generating an object of the application. Objects can be a logical entity around which a specific threads may execute. Objects may include multiple thread definitions from which the object may call to execute a thread to provide intermediate functionality of a process. Objects may establish links to processes along with process specific keys.

Application layer 328 generates processes and threads for execution by processors 376. During or after prosecution of each thread the state the thread may be captured as a process specification indicating the state of the process at the point in which the thread executed. Execution of thread 356 by processor 376 may trigger application class processing 320 to execute process 336 to identifying the process 344 that corresponds to thread 356 and map process 344 to the object identifier of object 340 that called the thread. Once mapped, application class processing 320 may execute process 348 to identify each thread definition 352 of object 340 to identify the particular thread definition that corresponds to thread 356.

Thread definitions (e.g., activities of an object) may include individual actions specific to the application functionality, which can be executed in series, concurrently, or a combination thereof, without dependency on other threads. Thread definitions may be associated with objects and may be interweaved with respect to time and sequence to provide a process. Threads from thread definitions may execute more than once in a particular process and are not bound to execute in particular sequences. The quantity of distinct thread definitions of an object may determine a level of granularity of data that may be captured within the process specification.

The particular thread definition within the list of thread definitions is identified, application class processing 320 may then execute process 360 to obtain resource requirements 368 that indicate a list resource types (e.g., record fields, attributes, processing cycles, processing time, volatile memory, non-volatile memory, registers, network bandwidth, or the like). For instance, some threads may execute on a local processor using random access memory or cache memory. Other threads may require more substantial resource such as multi-core processors, a network bandwidth, volatile and non-volatile memory, etc. Resource requirements 368 may indicate the resource types needed to execute the application.

Application class processing 320 may then execute process 372 obtaining values for each resource type and generate a process specification for thread 356. The values of each resource type indicate the quantity of resources consumed when thread 356 executed. In addition to the state of the process at the point in which thread 356 executed, process specifications may include a trace of the process including the order in which each thread of the process executed before the process terminated. The trace may represent the threads a nodes within a tree structure with process 344 being the root node of the tree and each node thereafter being a thread that executed. In some instances, process keys may assigned to each thread and to process 344. Process keys may indicate the position within the tree that the corresponding thread is located. In other instances, the trace may represent the threads as a directed graph where each node of the directed graph represents a thread. Arrows from a node to another may represent a thread executing after another thread or a thread calling another thread. In still yet other instances, the trace may represent the threads as tables that include the resource types, resource values, process keys, and the like for each thread of process 344.

Once generated process specifications may be output 380 to local or remote persistent storage. In some instances, process specification may be used to modify future processes or currently executing processes. For instance, a particular process for executing a resource request may include threads that generate a resource request, transmit the resource request to a first computing device within the distributed environment, transmit a new resource request to another computing device. As a result of the first computing device lacking the appropriate resources, additional threads had to be executed. The process may be modified to request a manifest of available resources from available computing devices to reduce the threads of the process. The process may also modified by modifying the initial resource request to obtain available resources from the first computing device and generate a second resource request for the difference from another computing device.

Application layer 328 may execute the modified process in place of the process next time the process is initiated. In some instances, the process may be modified at runtime. Application layer 328 may detect the point in which the current thread is executing and modify a subsequent pointer to point to an address of the modified thread. Processors 376 may reach the pointer and continue execution using the modified process.

Figure 4:
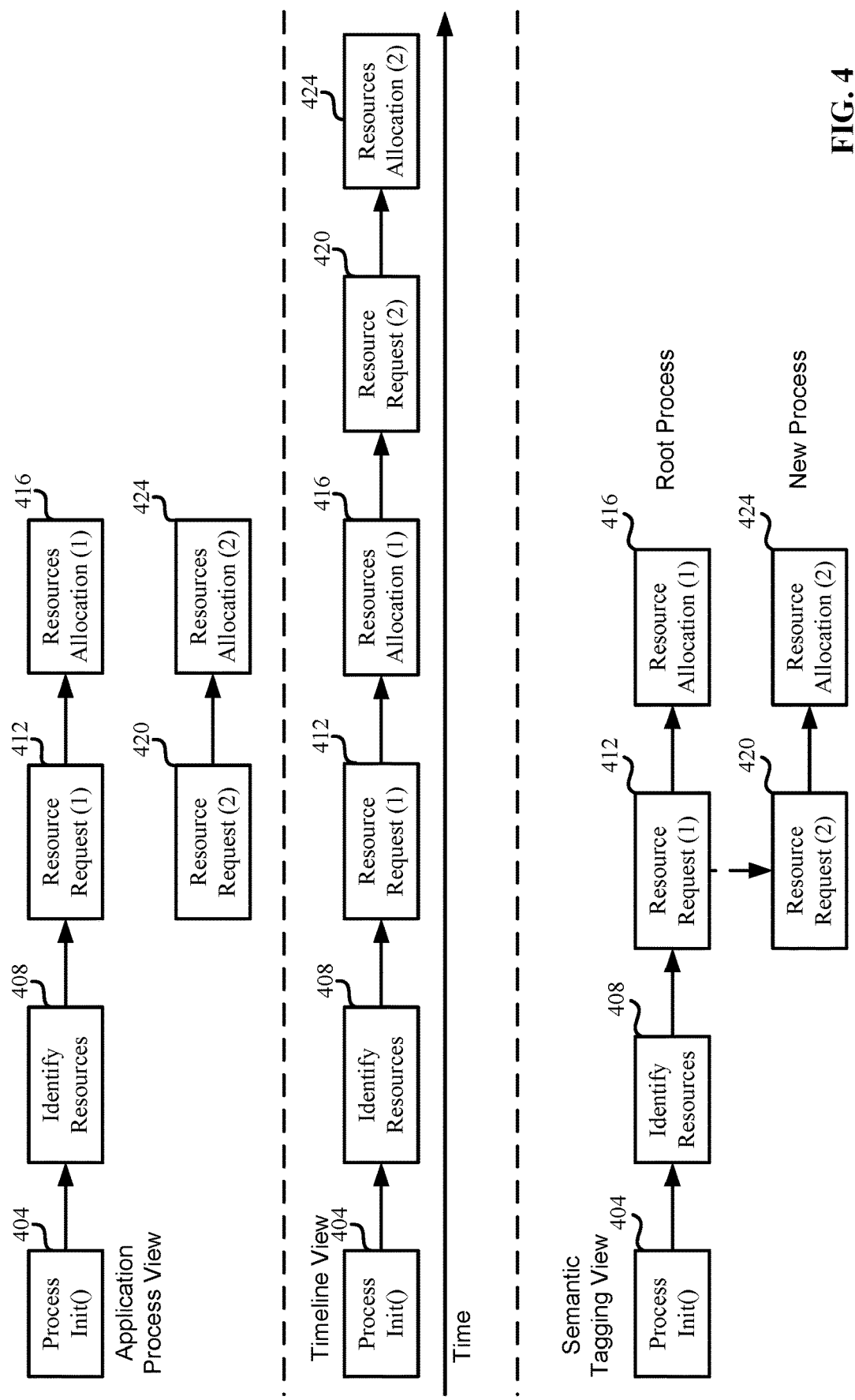
FIG. 4 illustrates a block diagram of various processing views of a variant case during operation of semantic tagging according to at least one aspect of the disclosure.
Figure 5:
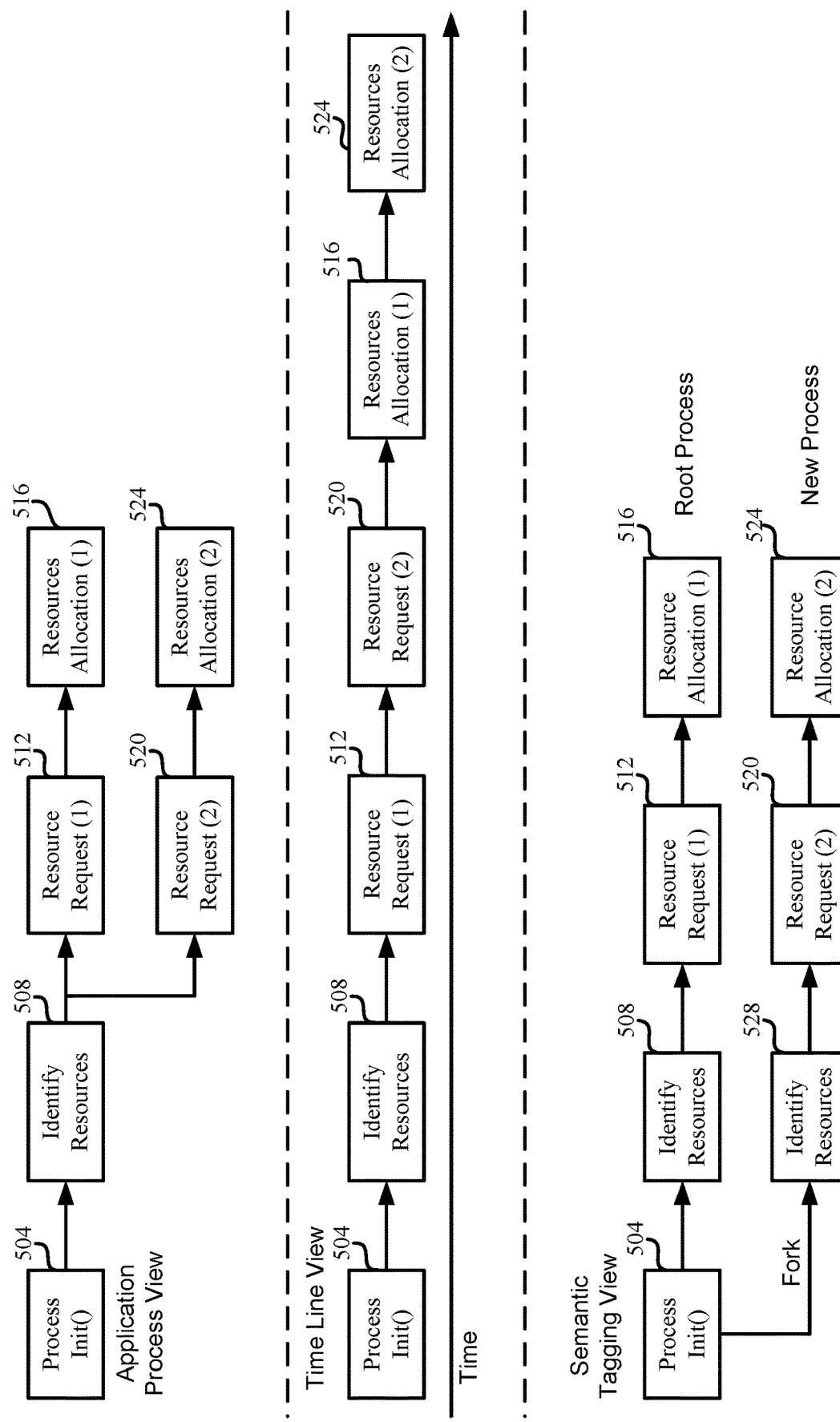
FIG. 5 is a block diagram of various processing views of a divergent case during operation of semantic tagging according to at least one aspect of the disclosure.

FIG. 4 illustrates a block diagram of various processing views of a variant case during operation of semantic tagging according to at least one aspect of the disclosure. FIG. 4 and FIG. 5 depict an example processing operation of a distributed application in which threads execute to request and obtain resources (e.g., articles, processor cycles or bandwidth, network bandwidth, memory, or the like). For instance, a three-dimensional modeling application require resource from multiple computing devices in order to execute in real-time. Throughout execution the application may request resources such that small portions of application may be executed by different computing devices. The output may be transmitted to primary device which may then render the three-dimensional model.

The application identify for each discrete process or thread, the resources necessary to execute the process or thread. In some instances, a portion of the resources may not be accessible to the process (e.g., requested computing device lacks sufficient memory, processor bandwidth, etc.). If a particular computing device has the resources, the process or thread may be transferred for execution by the computing device and a result of the execution (e.g., the articles, data, graphical user interface, calculation, or the like) may be returned to the requester.

If no particular computing device has the available resources, the process may be sub-divided (e.g., based on threads, independent sets of instructions, or the like) into smaller processing units with a lower resource requirement. Sub-dividing generate entirely new processes/threads or modify the existing process/thread to require less resources (e.g., reducing instruction count, reducing memory usage such as variables or registers, reducing loops such that a loop may execute with less iterations with the removed iterations executing within another process/thread, or the like) and generate one or more new processes/threads. The application may again initiate a request for resource to the multiple computing devices. In some instances, process may be sub-divided down to individual instructions such that each instruction of the process may be executed by a different computing system.

In some instances, sub-dividing processes or threads may cause an error when the new process or thread cannot be linked to the original process or thread. This may occur when the process or thread initiated prior to the sub-dividing process. Process specifications, as represented in the semantic tagging view, may provide the association between the root process/thread and the new processes/threads. Maintaining the link to the root process/thread may enable improving the root process as redundancy and cycles may be identified and eliminated.

Application process view may provide a representation of the process from the perspective of the application layer. Application layer may initiate a process 404 that executes a resource identification thread 408 that identifies the resources by the application. Resource identification thread 408 may determine that the requested resources cannot be acquired from any particular computing device. Resource identification thread 408 may call resource request thread 412, which transmits a resource request to a first computing device. The first computing device may transmit an acknowledgement communication back to process 404. Resource allocation thread 416 may then transmit an allocation command to the first computing device to lock the resources to prevent another device or process form interfering. When the application no longer needs the resources a new thread may execute a communication to release the locked resources.

Since the first computing devices cannot provide all of the requested resources, a thread definition may be used to generate resource request thread 420. Since resource request thread 420 was generated after process 404 initialized, resource request thread 420 may not be associated with process 404. Resource request thread 420, which transmits a resource request to a second computing device. The second computing device may transmit an acknowledgement communication back to process 404. Resource allocation thread 424 may then transmit an allocation command to the second computing device to lock the resources.

The time line view represents the order in which each thread of process 404 executes. Despite the resource request thread 420 being generated in parallel to the execution of resource request thread 412, the resource request thread 412 and resource allocation thread 416 executed and terminated before resource request thread 420 and resource allocation thread 424 initiated.

The semantic tagging may provide a representation of the complete process reconstructed from one or more process specifications. The semantic tagging view includes additional data that links the add resource request thread 420 and resource allocation thread 424 to the process 404. In some instances, linking threads to a process may be based on detecting a command from a thread calling another thread or requesting a new thread be generated. In other instances, linking threads to a process may use indirect data such as a first thread being associated with a process and a second thread being associated with the first thread. Examples of criteria that may be used to link processes to threads include, but is not limited to, proximity of execution order such as when a first thread initiates execution within a threshold time interval of a second thread initiating execution, thread type such as a resource request, resource types, resource values, types of variables, previously executed thread, subsequently executed thread, combinations thereof, and the like.

FIG. 5 is a block diagram of various processing views of a divergent case during operation of semantic tagging according to at least one aspect of the disclosure. The divergent case may occur when threads diverge, but each thread of the process can be traced back to the process initialization. For instance, process 504 initializes and calls identify resources thread 508. In this case, the identify resources thread 508 generates two requests for resources, one to a first computing device and a second to a second computing device. Identify resources thread 508 calls resource request 512, which the calls resource allocation thread 516 to lock the resources of the first computing device. Identify resources thread 508 also calls resource request 520, which the calls resource allocation thread 524 to lock the resources of the first computing device.

The timeline view can represent the order in which the threads of the branching process execute. Since the second resource request/allocation was called with the first resource request/allocation, the resource request 520 executed immediately after resource request 512. In some instances, the execution order may be reversed with resource request 512 executing after resource request 520. Resource allocation thread 524 may execute after resource allocation thread 516. In some instances, resource request 512 and resource allocation thread 516 may execute in parallel with resource request 520 and resource allocation thread 524.

The semantic tagging may provide a representation of the complete process reconstructed from one or more process specifications. The semantic tagging view includes additional data that indicates how the process 504 diverged into two parallel thread paths. For instance, process may execute a fork system call to generate the divergent thread path. Rather than execute a single identify resources thread 508, a second identify resources 528 may execute with each identify resource thread executing to identify a smaller set of resources. Under the semantic tagging view each thread can be traced back to the initiation of process 504 thereby providing a complete recreation of the state of process 504 through the execution of each thread.

Figure 6:
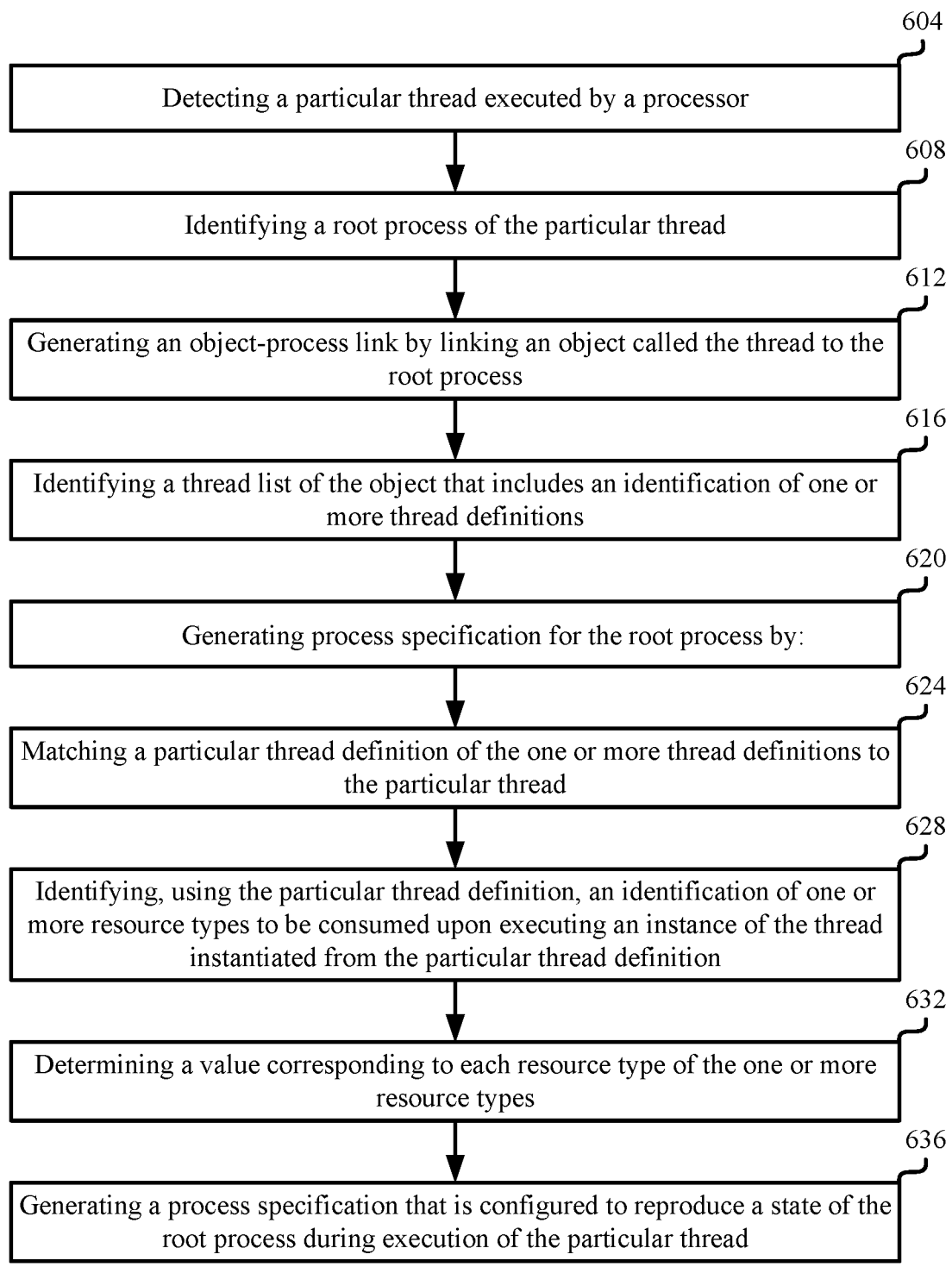
FIG. 6 is a flowchart of a process for generating process specifications according to at least one aspect of the disclosure.

FIG. 6 is a flowchart of a process for generating process specifications according to at least one aspect of the disclosure. At block 604, a semantic mapping API detects an execution of a particular thread by one or more processors of a computing device. The semantic mapping API may be an interface between an application class that instantiates processes and threads for execution and a configuration layer that indicates what types of processes/threads and data may be captured by the semantic mapping API. In some instances, each thread may include a thread key that acts as a signature of the thread. Thread keys may be unique to the particular thread and be generated by generating a hash (e.g., using a cryptographic or checksum based hashing function) of the all or a portion of the instructions of the thread. The semantic mapping API may including functions that may monitor a scheduler of the one or more processors for the thread key. Threads may also include a processor key that indicates the process within which the thread is executing.

In some instances, the thread keys may be generated based on the position of the thread within the process similar to an address. The thread key can be traced to identify other threads and processes associated with the process by using the thread key. For instance, processes may be represented as a tree with the root process at the root node of the tree. The second layer of the tree may include threads (as represented by nodes) called by the root process initialization instructions. The next layer may include threads (as represented by nodes) called from the threads of the previous layer and so on. Thread keys may use a mime-type syntax that uses the calling thread's address to generate the address for the called thread. For instance, given a root process with the address P001, the second layer of threads may be addressed as P001.01, P001.02 . . . P001.n. If the P001.01 thread called two more threads, those threads may be represented as P001.01.01 and P001.01.02 and so on. The address of a particular thread of a process may be used to trace the threads that executed prior to the particular thread.

At block 608, a root process of the particular thread may be identified. In some instances, the root node may be identified by tracing the thread key of the particular thread. In other instances, the root process may be identified by tracing memory addresses of the instructions executed by the processor. Tracing may span the entire cache memory, random-access memory, and persistent memory.

At block 612, a process-object link may be generated by linking an object that called the particular thread and the process within which the thread executed. The object that called the particular thread may be identified using the thread key, by a value of a field of the initiating process, or by a value of a field of the particular thread. Objects may include data, metadata, and instructions that execute to provide functions of the application. For instance, for a resource request process, an object may execute one or more threads for detecting resources of computing devices, requesting resources, allocating resource, and the like. Objects may include a one or more thread definitions that can be instantiated to execute various functions associated with the object. The object's type may dictate the one or more thread definitions included within the object such that different object types have different thread definitions. Each thread definition may be impendent and instantiated by the object into a thread, the thread being an instance of the thread definition. Each thread definition may include instructions to provide the functionality of the thread, resource types necessary to execute the thread, a value for each resource type indicating a quantity of the resource type, an expected input, an output generated as a result of receiving the expected input, metadata, and the like.

At block 616, the process-object link may be used to identify a thread list. The thread list includes the one or more thread definitions of the object. One of the one or more thread definitions includes the thread definition that was instantiated to generate the instance of the particular thread. The thread definition that correspond to the particular thread may provide additional data that may indicate how the thread was expected to execute, the resources that were expected to be consumed, and the like. The thread definition may indicate why a particular branch was taken, why the thread induced a cycle or infinite loop, and the like.

At block 620, A process specification may be generated for the process based on the particular thread. The process specification may be generated by: matching the particular thread definition that corresponded to the particular thread to the particular thread at block 624.

At block 628, the particular thread definition may be used to identify one or more resource types that may be necessary for the thread to execute. The one or more resource types may include resources of the computing device, resources of other computing devices, resources of the network, resources of other networks, combinations thereof, and the like. Examples of resource types can include, but is not limited to, expected input types, attributes, processor cycles, processor bandwidth, cache memory, random-access memory, persistent memory, network bandwidth, combinations thereof, and the like.

At block 632, a value corresponding to each resource type may be defined. The value may correspond with a quantity of the resource that may be necessary to execute the particular thread, a quantity of the resource type that was actually consumed by the thread, or a combination thereof. For instance, a thread may be executed to consume 100 processing cycles. During a previous execution of the thread, 112 processing cycles were consumed as a result of unanticipated instruction path of the thread executing. The difference between the expected value of the resource and the actual consumed value of the resource may be used to identify the cause the of extra resource consumption (e.g., the unanticipated instruction path) and modify the thread to reduce the resource consumption.

Resource consumption may be used to identify other inefficiencies including, but not limited to, improper memory allocations (e.g., allocating too much or too little memory), inefficient looping (e.g., loops that execute more than necessary to produce an expected output), recursion (e.g., when thread calls another instance of itself), invalid memory typing, unused variables, and the like).

At block 636, the process specification may be generated. The process specification may include some or all of: the thread definition, an identification of the root process, the thread key, the process-object link, a memory dump of the entire process, list of threads, an identification of the one or more resource types, an identification of the one or more values that correspond to the one or more resource types, metadata, and the like. The process specification may be used to reproduce the state of the process at the point in which the particular thread executed. Multiple process specifications may correspond to a same process with each process specification representing the state of the process at a point of execution of different threads.

In some instances, a process may execute more than once (e.g., multiple executions of the same function within the application). Each time the process executes it may be associated with a different set of process specifications. This may enable tracing each individual execution of the process. For instance, some processes may include errors such as memory leeks may only be apparent during some executions of the process. Process specifications corresponding to each execution of the process may be used isolate the root cause of the error by maintaining the state of both processes in which the error occurred and processes in which the error did not occur. Process specifications may be used for error detection, root cause analysis, error correction, and increase efficiency (e.g., reduce processing time or resources).

For instance, process specifications may be used to trace the root process to identify the threads that executed before the particular thread (e.g., using the thread key) and the threads that executed after (using memory tracing or the like). The process specification may generate a directed graph in which each node of the graph represents a thread that executed in the process based on the trace. Each node may include a pointer to the node of the thread that executed after the node. Other data structures may be used in addition to or in place of a directed graph such as tree, a table, a linked list, or the like. The directed graph may not be acyclic meaning one or more cycles may exist in the graph. A cycle may represent a redundant thread path in which a thread executed instead of point to a subsequent thread, pointed to a previously executed thread causing the previously executed thread to execute again. In some instances, a cycle may represent wasted resources in which some thread may execute more than necessary. In other instances, the cycle may represent an infinite loop in which the processor may stall executing the same set of threads over and over preventing other functions from executing on the processor.

The direct graph may converted into a direct acyclic graph my removing the cycle. Cycles may be removed by modifying the instructions of the threads that are part of the cycle. For instance, the threads may be modified to point to new threads rather than previously executed threads, conditional branching may be removed, threads may be tested to identify the cause of the redundancy (e.g., what input or processing is causing the redundancy). This may lead to a modification of the instructions or instruction order to eliminate the redundancy.

In some instances, threads that request or otherwise access resources of other computing devices may be modified to request or otherwise access the resources of different computing devices. For instance, some computing devices may, at runtime, lack requested resources. A first thread that requests those resources may stall or terminate as a result. The first thread may then call a previously executed thread to force the process to call the first thread again in an attempt to re-try the resource request. Since the computing lacks the requested resources, this loop may continue forever until the computing device has the available resources (if ever). Process specifications may be used to modify the thread to request resources from a different computing device or from multiple different computing devices, which may thereby eliminate the cycle of the direct graph converting the graph to a directed acyclic graph.

A process may include a set number of threads that may increase or decrease at runtime. For instance, given the resource request example above, the first thread may request resources that cannot be satisfied by the requested computing device. The first thread may be modified to reduce the amount of resources request and spawn a second thread to request the difference. Since the first thread spawned the second thread rather than the process, the second thread may not be associated with the same process. The process specification may be used to modify the second thread to link the second thread with the root process. The resource request of the second thread may be associated with the process requesting the resources, which may ensure the process is able to allocate the appropriate resources once the resource request threads (e.g., the first and the second) terminate.

In some instances, associating the second thread may necessitate splitting the process specification into two process specifications the first process specification corresponding to the root thread, the first thread, and each thread that was called from the first thread (e.g., excluding the second thread, spawned as a parallel execution flow) and the second process specification corresponding to the root thread, the first thread, and each thread that was called from the second thread. The first thread and the second thread may be identified using the thread key associated with each thread and a timestamp of the initiation of execution of each thread. Since the second thread spawned from the first thread, the timestamps can indicate the threads executed at close to the same time interval. The thread keys may then indicate that the second thread spawned from the first thread.

Process specifications may be defined from other process specifications as well as from executed threads. For instance, a root process or a parent thread may generate multiple threads that execute concurrently (e.g., synchronously or asynchronously) on one or more processors of one or more computing devices (e.g., within a distributed environment). A process specification of the parent process or thread may be used to generate a process specification of each concurrently execution path. A first process specification may include (1) the root process or parent thread that initiated the concurrent execution flow by calling a first thread, second thread . . . and nth thread, (2), the first thread, and (3) each thread that was called by the first thread and the threads that were called by those threads and so on until that concurrent execution path terminates (e.g., there are no more threads). A second process specification may include the root process or thread, the second thread, and each thread that was called by the second thread and the threads that were called by those threads and so on. A process specification may be generated for each concurrent thread path to individually trace the parallel execution flow of the process.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
    initiating, with a first computing device, a process of an application, the process executing a resource identification thread;
    in response to executing the resource identification thread, receiving, from the first computing device, an indication that the first computing device has insufficient resources to execute the application;
    in response to receiving the indication that the first computing device has insufficient resources to execute the application, calling a first resource request thread, the first resource request thread configured to initiate a transmission of a first resource request to the first computing device;
    in response to calling the first resource request thread, calling a first resource allocation thread, the first resource allocation thread configured to initiate a transmission of a first allocation command to the first computing device;
    calling a second resource request thread, the second resource request thread configured to initiate a transmission of a resource request to a second computing device;
    in response to calling the second resource request thread, calling a second resource allocation thread, the second resource allocation thread configured to initiate a transmission of a second allocation command to the second computing device; and
    generating a representation of the process of the application, the representation of the process linking the second resource request thread and the second resource allocation thread to the process of the application.

2. The method of claim 1, wherein the resource identification thread is configured to identify resources needed to execute the application.

3. The method of claim 1, further comprising:
    receiving, from the first computing device, an acknowledgement communication, the acknowledgement communication acknowledging that the first resource request was received by the first computing device.

4. The method of claim 1, wherein the first allocation command instructs the first computing device to lock available resources of the first computing device.

5. The method of claim 1, wherein the second allocation command instructs the second computing device to lock available resources of the second computing device.

6. The method of claim 1, wherein the representation indicates a state of the process of the application when the process is initiated.

7. The method of claim 1, wherein the representation indicates a chronological order in which threads of the process are executed.

8. A system comprising:
one or more processors; and
one or more computer-readable media storing instructions which, when executed by the one or more processors, cause the system to perform operations comprising:
  initiating, with a first computing device, a process of an application, the process executing a resource identification thread;
  in response to executing the resource identification thread, receiving, from the first computing device, an indication that the first computing device has insufficient resources to execute the application;
  in response to receiving the indication that the first computing device has insufficient resources to execute the application, calling a first resource request thread, the first resource request thread configured to initiate a transmission of a first resource request to the first computing device;
  in response to calling the first resource request thread, calling a first resource allocation thread, the first resource allocation thread configured to initiate a transmission of a first allocation command to the first computing device;
  calling a second resource request thread, the second resource request thread configured to initiate a transmission of a resource request to a second computing device;
  in response to calling the second resource request thread, calling a second resource allocation thread, the second resource allocation thread configured to initiate a transmission of a second allocation command to the second computing device; and
  generating a representation of the process of the application, the representation of the process linking the second resource request thread and the second resource allocation thread to the process of the application.

9. The system of claim 8, wherein the resource identification thread is configured to identify resources needed to execute the application.

10. The system of claim 8, the operations further comprising:
  receiving, from the first computing device, an acknowledgement communication, the acknowledgement communication acknowledging that the first resource request was received by the first computing device.

11. The system of claim 8, wherein the first allocation command instructs the first computing device to lock available resources of the first computing device.

12. The system of claim 8, wherein the second allocation command instructs the second computing device to lock available resources of the second computing device.

13. The system of claim 8, wherein the representation indicates a state of the process of the application when the process is initiated.

14. The system of claim 8, wherein the representation indicates a chronological order in which threads of the process are executed.

15. A non-transitory computer-readable medium storing instructions that when executed by one or more processors cause a system to perform operations including:
  initiating, with a first computing device, a process of an application, the process executing a resource identification thread;
  in response to executing the resource identification thread, receiving, from the first computing device, an indication that the first computing device has insufficient resources to execute the application;
  in response to receiving the indication that the first computing device has insufficient resources to execute the application, calling a first resource request thread, the first resource request thread configured to initiate a transmission of a first resource request to the first computing device;
  in response to calling the first resource request thread, calling a first resource allocation thread, the first resource allocation thread configured to initiate a transmission of a first allocation command to the first computing device;
  calling a second resource request thread, the second resource request thread configured to initiate a transmission of a resource request to a second computing device;
  in response to calling the second resource request thread, calling a second resource allocation thread, the second resource allocation thread configured to initiate a transmission of a second allocation command to the second computing device; and
  generating a representation of the process of the application, the representation of the process linking the second resource request thread and the second resource allocation thread to the process of the application.

16. The non-transitory computer-readable medium of claim 15, wherein the resource identification thread is configured to identify resources needed to execute the application.

17. The non-transitory computer-readable medium of claim 15, wherein the first allocation command instructs the first computing device to lock available resources of the first computing device.

18. The non-transitory computer-readable medium of claim 15, wherein the second allocation command instructs the second computing device to lock available resources of the second computing device.

19. The non-transitory computer-readable medium of claim 15, wherein the representation indicates a state of the process of the application when the process is initiated.

20. The non-transitory computer-readable medium of claim 15, wherein the representation indicates a chronological order in which threads of the process are executed.

* * * * *